Dec. 20, 1960 W. S. PIKE ET AL 2,965,712

AUTOMATIC SENSITIVITY CONTROL FOR TELEVISION CAMERA TUBES

Filed Aug. 14, 1957

INVENTORS
WINTHROP S. PIKE &
LESLIE E. FLORY

BY

ATTORNEY

United States Patent Office 2,965,712
Patented Dec. 20, 1960

2,965,712

AUTOMATIC SENSITIVITY CONTROL FOR TELEVISION CAMERA TUBES

Winthrop S. Pike and Leslie E. Flory, Princeton, N.J., assignors to Radio Corporation of America, a corporation of Delaware Filed Aug. 14, 1957, Ser. No. 678,078

7 Claims. (Cl. 178—7.2)

This invention relates to television camera tube circuits, and more particularly to apparatus for automatically controlling the sensitivity of camera tubes in response to changing light levels in the scene being viewed by the camera.

In order to provide proper operation of a television camera, it is necessary that some adjustment be provided to control the response of the camera tube to changing light levels encountered in the scene being viewed by the camera. This may be done manually, of course, by adjusting an iris diaphragm associated with the lens or lenses of the camera. Adjustment of the sensitivity of the camera tube may also be provided by manual control of the operating voltages that are applied to selected electrodes of the camera tube. These adjustments may be made automatic, such as, mechanically controlling the iris diaphragm of the lens in accordance with the light received by an auxiliary photocell device, or by using the video signal developed by the camera tube to automatically control the operating voltage applied to an electrode or electrodes of the camera tube. Such devices may involve the use of complex mechanical linkages and driving motors or the use of auxiliary amplifying devices. These systems tend to become cumbersome and bulky, and render it impractical to use them with small, compact television cameras.

It is therefore an object of this invention to provide an improved circuit, that is both simple and convenient, to control the sensitivity of a camera tube having a photoconductive signal electrode to automatically compensate for changing light levels encountered in the scene being viewed by a television camera.

It is another object of this invention to provide an improved sensitivity control circuit for a television camera tube to automatically vary the operating voltage applied to a photoconductive signal electrode of the camera tube in response to changing levels of illumination that are viewed by the camera.

In accordance with the invention the sensitivity of a television camera tube is automatically controlled in accordance with the level of illumination of the scene being viewed by the camera by using a photoconductive cell or diode, whose resistance changes with incident light, to vary the operating voltage applied to a photoconductive signal electrode of the camera tube.

The invention will be further understood when the following description is read in connection with the accompanying drawings in which.

Figure 1:
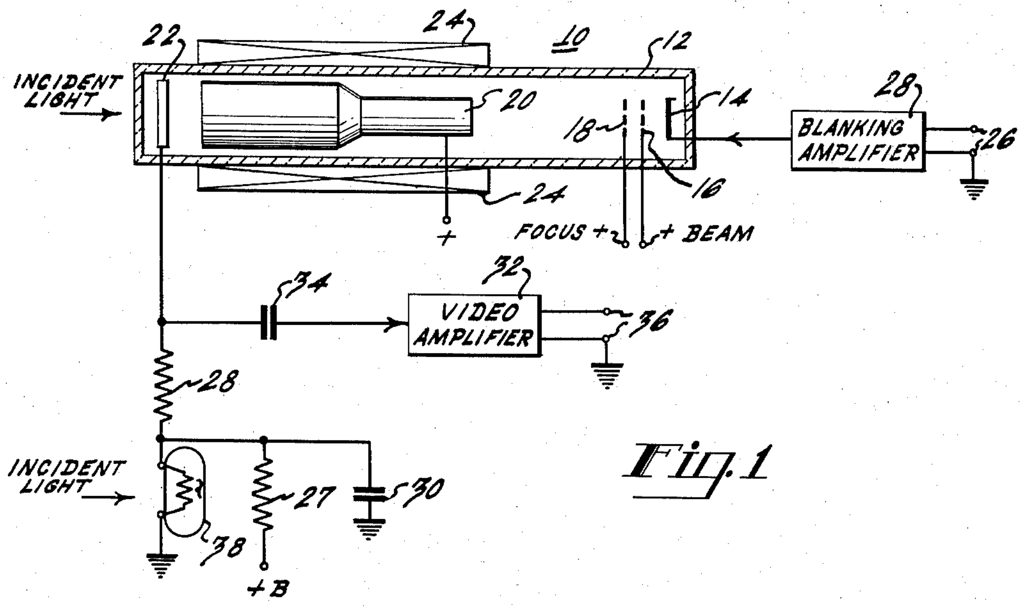
Figure 1 is a schematic circuit diagram of a television camera tube circuit in accordance with the invention.

Referring now to the drawing, and in particular to Figure 1, a vidicon type television camera tube 10 is indicated schematically as including a glass envelope 12 enclosing an electron emitting cathode 14, a beam forming electrode 16, a focusing electrode 18, and an accelerating electrode 20. The beam forming electrode 16, the focus electrode 18 and the accelerating electrode 20 are supplied with positive operating potential and arranged to form and direct an electron beam to strike a photoconductive target or signal electrode 22 of the tube. The electron beam is deflected magnetically by vertical and horizontal deflection coils 24, which are supplied with the proper currents and voltages from deflection circuits (not shown) to scan the electron beam in the required manner across the target 22. Blanking signals to prevent generation of the electron beam 22 during horizontal and vertical retrace intervals are applied to a pair of blanking signal input terminals 26. The blanking signals are amplified in a blanking amplifier 28 and applied to the cathode 14 of the vidicon 10. Operating voltage from a source indicated schematically by the symbol +B for the signal or target electrode 22 is supplied through a filter resistor 27 and a video load resistor 28. The filter resistor 27 is bypassed at video frequencies by a bypass capacitor 30.

In operation, incident light from the scene being viewed by a television camera in which the vidicon 10 is used is focused upon the outer face or photoconductive target of the signal electrode 22 by a series of optical lenses. An image is thus formed of the desired scene upon the outer face of the target 22. The electron beam as it is scanned across the inner face, or gun side, of the target 22 generates a video signal which is developed across the video load resistor 28, which is connected directly between the signal or target electrode 22 and signal ground or a point of reference potential through the bypass capacitor 30. The video signal developed across the video load resistor 28 is applied to a video amplifier 32 through a coupling capacitor 34, and the video output signal of the camera is available at a pair of video output terminals 36.

Normally, the target voltage of a typical vidicon camera tube is on the order of 10 to 50 volts and a typical value for the filter resistor 27 is on the order of 500,000 ohms. The target or signal electrode current is normally between 0.1 and 0.2 microamperes. With changing light levels the target current of the vidicon camera tube 10 may vary from a few thousandths of a microampere to a few tenths of a microampere. This is an undesirable range of variation in the target or signal current, and produces, on a kinescope which reproduces the scene, widely varying picture information.

In accordance with the invention, automatic correction of different light levels viewed by the camera is obtained by connecting a photoconductive cell or diode 38 between ground and the junction of the filter resistor 27 and the video load resistor 28. Thus the direct voltage appearing acrss the photoconductive diode 38 is nearly equal to the direct voltage on the signal electrode 22, since the resistance of the video load resistor 28 is small compared to that of the filter resistor 27. The photoconductive diode, such as is commercially available as RCA type 6694A, has the property of increasing the current flow through the diode with increasing light incident on the diode, that is, its resistance varies with the amount of light incident on the device. In order to accomplish the desired compensation the filter resistor 27 must be made of a somewhat higher value than normal, that is, on the order of five to ten megohms. Thus, as the light level increases on the target electrode 22, tending to increase the signal current, the same light is incident upon the photoconductive diode 38 increasing the direct current flow therethrough. This increase in diode current causes a greater drop in the voltage across the filter resistor 27, which decreases the target voltage, thus decreasing the target current. This action tends to maintain the average target current constant as the light level of the scene being viewed by the camera changes.

In a typical example, automatic compensation of a type 6198 vidicon camera tube has been achieved over a range of light levels of approximately 100 to 1 by using a target operating voltage supply of 50 volts, a filter resistor 27 of 7 megohms, and an RCA type 6694A photoconductive diode. The sensitivity of the automatic compensation may be controlled, of course, by adjusting the value of the filter resistor 27. The greater the value of the resistor, the more sensitive is the compensating action.

Figure 2:
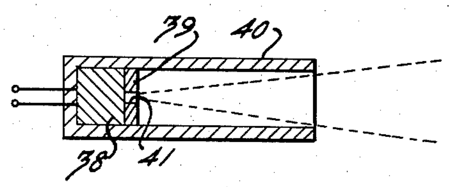
Figure 2 is a sectional view of the manner in which a photoconductive cell or diode may be mounted in accordance with the invention.

It is necessary, of course, that the photoconductive diode "see" approximately the same area that is seen by the camera. This may be accomplished as shown in Figure 2 by enclosing the photoconductive diode 38 in an opaque tube 40. The photoconductive diode 38 is spaced away from the front or opening of the tube 40 and covered by a plate 39 having an aperture 41 to admit light so that the angle of view of the photoconductive diode 38 is the same as that of the camera lens. If different lenses are used on the camera having different fields of view, it would, of course be desirable to move the photoconductive diode 38 within the tube 40 to change the angle of view, or, more simply, to provide a lens system for the photoconductive diode 38 having the same field of view as the lens system for the camera. In practice, with simple, single-lens cameras the photoconductive diode 38 may be set behind an aperture in the front wall of the camera to admit light from the same direction and with approximately the same field of view as the camera lens. Automatic compensation for changing light levels is thus performed over a wide range of light levels and no manual control by the operator of the camera is required.

Figure 3:
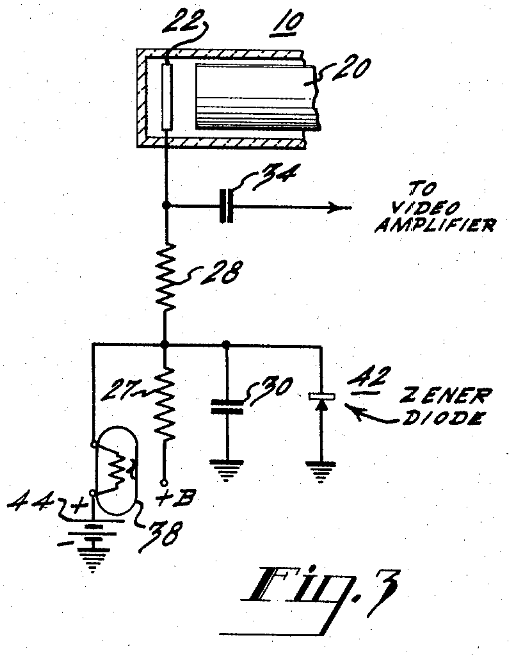
Figure 3 is a schematic circuit diagram illustrating a further feature of the invention.

It may be desirable to limit the maximum and minimum voltages that may be applied to the target electrode 22. This may be accomplished, as shown in Figure 3, by connecting a "zener" diode 42 across the photoconductive cell 38 and a battery 44 in series with the cell 38, having its negative terminal connected to ground. The "zener" diode is of the type disclosed in a patent to Shockley, No. 2,714,702, patented August 2, 1955, and has the property of maintaining a constant voltage across the diode when a particular reverse voltage exists across the diode. This particular reverse voltage is called the "zener" voltage. The "zener" voltage is chosen to be equal to the maximum voltage to be applied to the target electrode 22. The circuit shown in Figure 3 operates in the same manner as that described with reference to Figure 1, until a voltage appears across the photoconductive diode 38 that equals the "zener" voltage of the "zener" diode 42. When the "zener" voltage is reached the voltage can no longer increase across the "zener" diode 42 and thus a maximum voltage is determined for the target electrode 22.

Since some camera tubes of the type having a photoconductive signal electrode do not operate well with target voltages near zero, it may be desirable to provide a minimum voltage for the target voltage excursions. This may be accomplished by connecting the battery 44 in series with the photoconductive cell 38 thus setting a minimum voltage that the target 22 may have.

A compensating circuit for a television camera tube of the type having a photoconductive signal electrode which may find use in television cameras, particularly of small, compact design, is characterized by its extreme simplicity and economy, and by the compensation for a wide range of varying light levels that may be obtained. The circuit eliminates the need for manually adjusting voltages or iris diaphragms when using the camera, and makes it particularly useful when inexperienced operators are using the camera or when the camera is completely unattended.

What is claimed is:

1. An automatic sensitivity control for a television camera tube of a type having a photoconductive signal electrode adapted to be scanned by an electron beam to produce a video signal, comprising in combination means including a source of operating voltage and a resistor element for applying an operating voltage from said source to said signal electrode, a device having a resistance that varies in response to light incident on said device, and means including a connection to said resistor element for controlling the voltage across said resistor element in response to the variation in resistance of said device in accordance with light incident on said device to vary the operating voltage applied to said signal electrode.

2. An automatic sensitivity control for a television camera tube of a type having a photoconductive signal electrode adapted to be scanned by an electron beam to produce a video signal, comprising in combination means including a resistor element for applying an operating voltage to said signal electrode, a light responsive device having a varying current carrying capacity responsive to light incident on said device, and means including a connection to said resistor element for controlling the voltage across said resistor element in response to the current through said device to vary the operating voltage of said signal electrode in accordance with light incident on said device.

3. An automatic sensitivity control for a television camera tube of a type having a photoconductive signal electrode adapted to be scanned by an electron beam to produce a video signal, comprising in combination a source of operating voltage and circuit means for applying a direct operating voltage from said source to said signal electrode including a resistor element connected to be traversed by the signal current of said signal electrode, a photoconductive device having a resistance varying in response to light incident on said device, and circuit means for connecting said device in parallel with said resistor element to vary the voltage across said resistor element in response to the variation of resistance of said device in accordance with variations of light incident on said device to vary the voltage of said signal electrode.

4. In a television camera system including a camera tube of the type having a photoconductive signal electrode adapted to be scanned by an electron beam to produce a video signal in response to light incident on said signal electrode, an automatic sensitivity control circuit for said camera tube, comprising in combination a source of operating potential and means including resistor element for applying an operating potential from said source to said signal electrode, a photoconductive device having a resistance that varies in response to light incident on said device, means connecting said device in parallel with said resistor element to vary the voltage across said resistor element in accordance with light incident on the device, and means for directing approximately the same light on said photoconductive device as is incident on said signal electrode.

5. In a television camera system including a camera tube of the type having a photoconductive signal electrode adapted to be scanned by an electron beam to produce a video signal in response to light incident on said signal electrode, an automatic sensitivity control circuit for said camera tube comprising in combination, means including a filter circuit for applying an operating potential to said signal electrode, said filter circuit comprising a resistor connected to be traversed by the signal current of said signal electrode and a capacitor connected to bypass said resistor for signal currents to a point of reference potential for said sensitivity control circuit, a photoconductive device having a resistance responsive to light incident on said device connected between said point of reference potential and the junction of said filter resistor and said capacitor, and means for directing approximately the same light on said photoconductive device as is incident on said signal electrode.

6. In a television camera system including a camera tube of the type having a photoconductive signal electrode adapted to have an optical image of a scene viewed by said camera formed on one face thereof and to be scanned by an electron beam on another face thereof to produce a video signal indicative of the optical image, an automatic sensitivity control circuit for said camera tube comprising in combination a source of operating potential, means including a filter circuit for applying operating potential from said source to said signal electrode, said filter circuit comprising a resistor connected serially between said source and said signal electrode and a capacitor connected between the end of said resistor remote from said source and a point of reference potential for said sensitivity control circuit, a photoconductive device having a resistance varying responsive to light incident on said device connected in parallel with said capacitor, and means for directing approximately the same light on said photoconductive device as is incident on the one face of the signal electrode of said camera tube to form the optical image thereon.

7. An automatic sensitivity control for a television camera tube of a type having a photoconductive signal electrode adapted to be scanned by an electron beam to produce a video signal, comprising in combination a video load resistor, a second resistor, means for applying an operating voltage to said signal electrode through said second-named resistor and said load resistor in series, a device having a resistance that varies in response to light incident on said device, means connecting said device in parallel relationship with said second-named resistor, the arrangement being such that the direct voltage appearing across said photoconductive device is nearly equal to the direct voltage on said signal electrode.

References Cited in the file of this patent

UNITED STATES PATENTS

| | | |
|---|---|---|
| 2,134,851 | Blumlein | Nov. 1, 1938 |
| 2,786,960 | Palmer | Mar. 26, 1957 |
| 2,833,957 | Horowitz | May 6, 1958 |
| 2,843,757 | St. John | July 15, 1958 |